United States Patent [19]

Sismour, Jr.

[11] Patent Number: 4,870,308
[45] Date of Patent: Sep. 26, 1989

[54] FLEXIBLE CONDUCTOR AND DYNAMOELECTRIC MACHINE INCORPORATING THE SAME

[75] Inventor: Albert C. Sismour, Jr., Casselberry, Fla.

[73] Assignee: Westinghouse Electric Corp., Pittsburgh, Pa.

[21] Appl. No.: 207,842

[22] Filed: Jun. 17, 1988

[51] Int. Cl.⁴ .............................................. H02K 11/00
[52] U.S. Cl. ...................................... 310/71; 439/10; 174/99 E
[58] Field of Search .................... 338/316; 439/32, 33, 439/10; 174/13, 99 E; 310/680, 71

[56] References Cited

U.S. PATENT DOCUMENTS

| | | | |
|---|---|---|---|
| 1,967,340 | 7/1934 | Van Splunter | 439/33 |
| 3,422,213 | 1/1969 | Webb | 174/71 R |
| 3,916,230 | 10/1975 | Albaric et al. | 310/61 |
| 4,204,085 | 5/1980 | Chapman et al. | 439/33 |

FOREIGN PATENT DOCUMENTS 914403 7/1954 Fed. Rep. of Germany ........ 174/13

Primary Examiner—Patrick R. Salce
Assistant Examiner—Judson, H. Jones

[57] ABSTRACT

A flexible conductor for use in a dynamoelectric machine to electrically connect a radial lead of a rotor with field windings and a dynamoelectric machine incorporating such a flexible conductor are disclosed. The flexible conductor has first and second conductive members, the first for attachment to the radial lead and the second, of a U-shaped construction, for connection to the field windings. The two conductive members are spaced apart to form a gap and a flexible connector spans the gap with a portion thereof extending through the gap in the direction of a leg of the second conductive member. The flexible connector is formed from a plurality of sandwiched conductive strips having slots therein which form a catenary connection between the two conductive members, whose radial and tangential stiffness is equal.

10 Claims, 3 Drawing Sheets

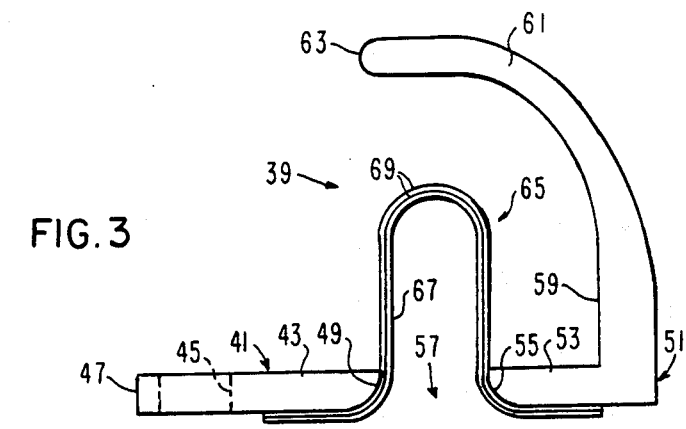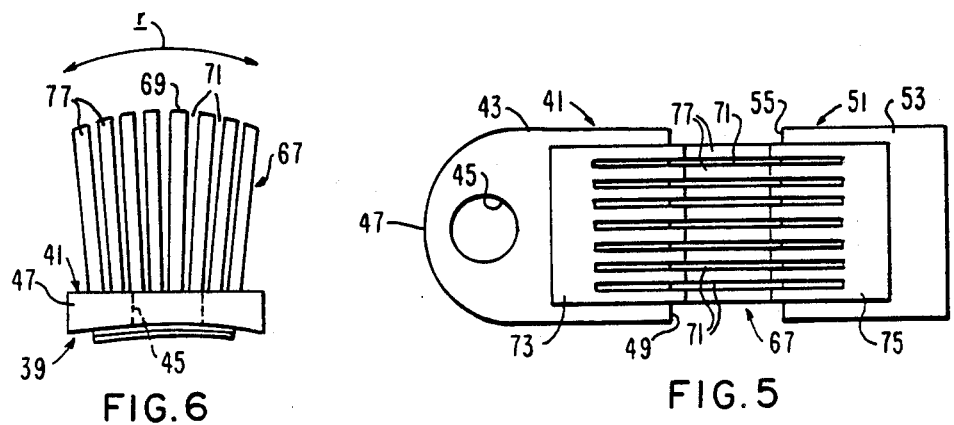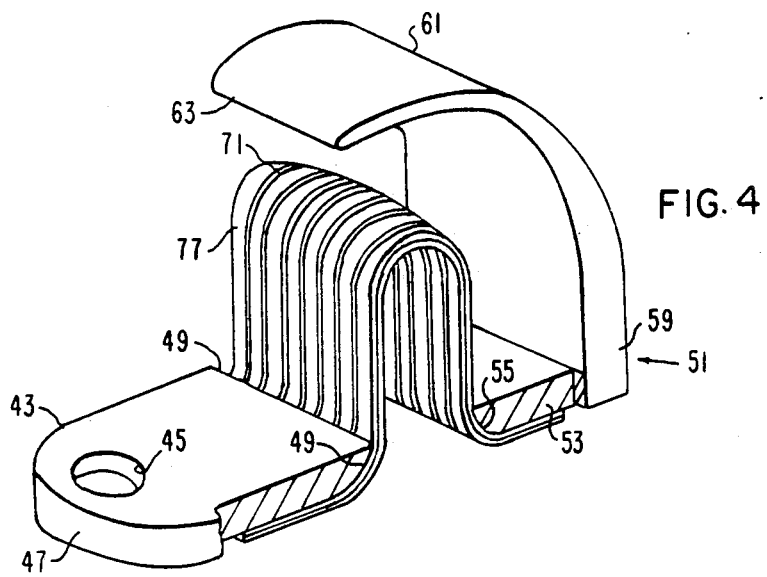

FLEXIBLE CONDUCTOR AND DYNAMOELECTRIC MACHINE INCORPORATING THE SAME

FIELD OF THE INVENTION

The invention relates to a flexible conductor for use in a turbine generator to electrically connect a radial lead of a generator rotor to the field windings of the rotor and to a dynamoelectric machine incorporating such a flexible conductor.

BACKGROUND OF THE INVENTION

Dynamoelectric machines, such as turbine generators generally have a rotor that is axially positioned within a stator core that comprises a plurality of axially thin annular laminations that are assembled together to form a cylindrical stator core. This stator core is supported within a stationary frame of a housing, with the rotor disposed within the stator core. The rotor is formed as a cylindrical member having a central portion, facing the stator core, and end shafts. An end face of the central portion is formed at the location of the shaft.

Field windings of the generator are mounted in slots machined in the body of the generator rotor, spaced from the shaft, which windings carry DC (direct current). The current comes from a collector or exciter which is located in the end of the generator rotor and flows in axial leads that are positioned in the bore of the rotor. The current is transmitted to the outer surface of the rotor shaft by a radial lead that is threaded into the axial lead.

Attached to the top of the radial lead is a conductive member, such as a J-shaped strap, which transmits current from the radial lead to the field windings under the retaining rings which support these windings. An axial portion of this conductive member is normally contained in a slot along the outer surface of the rotor by retaining wedges such that the conductive member carries the current along the outer surface of the rotor shaft to the central portion of the rotor and then radially outwardly along the face of the central portion to the radially spaced field windings.

In a typical rotor construction, the conductive member is held by wedges and cleats to the shaft and the face of the central portion of the rotor. Where the rotor has been undercut, that is, a 360 degrees slot formed in the end face of the central portion of the rotor, to reduce structuralbourne noise in a generator, the conductive member cannot be directed along the shaft and outwardly along the face of the central portion, since the same needs to span the gap formed by the undercut without interfering with the noise reduction capabilities thereof.

It is an object of the present invention to provide a flexible connector for electrically connecting a radial lead of a generator rotor to the field windings thereof which will span the gap formed by an undercut in the end face of the central portion of the rotor without interfering with the noise reduction capabilities of the undercut.

It is another object of the present invention to provide an improved dynamoelectric machine that includes a flexible conductor connecting the radial lead of a rotor to the field windings thereof which conductor will span the gap formed by an undercut in the end face of the central portion of the rotor, without interfering with the noise reduction capabilities of the undercut.

SUMMARY OF THE INVENTION

With these objects in view, the present invention resides in a flexible conductor for electrically connecting a radial lead of a generator rotor with field windings of the rotor, the conductor having a first conductive member that is connectible to the radial lead of the rotor and a second conductive member having a generally U-shape that has a first end spaced from the first conductive member, to provide a gap, and a second end connectible to the field windings, with a flexible connector spanning the gap. The flexible connector has a portion that extends through the gap in the direction of the second conductive member and conductively connects the first conductive member to the second conductive member.

The first conductive member is preferably a conductive strap that has an aperture adjacent a first end thereof, for attachment to the radial lead of the rotor, and a second end. The second conductive member is preferably a U-shaped conductive strap having a first leg aligned with the first conductive member but spaced therefrom, and a second leg that is connectible to the field windings. The flexible connector is formed from a plurality of sandwiched strips of conductive material with slots formed therein along a central portion of the length of the strips, the slots extending along the strips at least through the length thereof that forms the portion of the connector that extends through the gap between the first and second conductive straps. Proportions of the strips are such as to provide equal stiffness of the connector in a radial and tangential direction.

The flexible conductor is incorporated into a dynamoeletric machine to form an improved machine, the machine having a cylindrical stator core formed from a plurality of axially adjacent laminations, and a rotor that has an end face disposed in the stator core, which rotor has a shaft extending from the end face. The shaft has axial leads in a bore thereof and a radial lead extending from the axial leads to the outer surface of the shaft, and a plurality field windings are provided radially spaced from the shaft. The flexible conductor electrically connects the radial lead to the field windings.

BRIEF DESCRIPTION OF THE DRAWINGS

The invention will become more readily apparent from the following description of a preferred embodiment thereof shown, by way of example only, in the accompanying drawings, wherein:

FIG. 3 is a side view of an embodiment of the flexible conductor of the present invention;

FIG. 4 is a perspective view of the flexible conductor shown in FIG. 3;

FIG. 5 is a bottom plan view of the flexible conductor shown in FIG. 3; and

FIG. 6 is a view of the flexible connector portion of the conductor looking from the one end of the first strap.

DETAILED DESCRIPTION OF THE PREFERRED EMBODIMENT

The present invention is primarily concerned with the electrical connection between a radial lead on a shaft of a rotor and the field windings on the rotor in a dynamoelectric machine, and an improved dynamoelectric machine incorporating such a connection.

Figure 1:
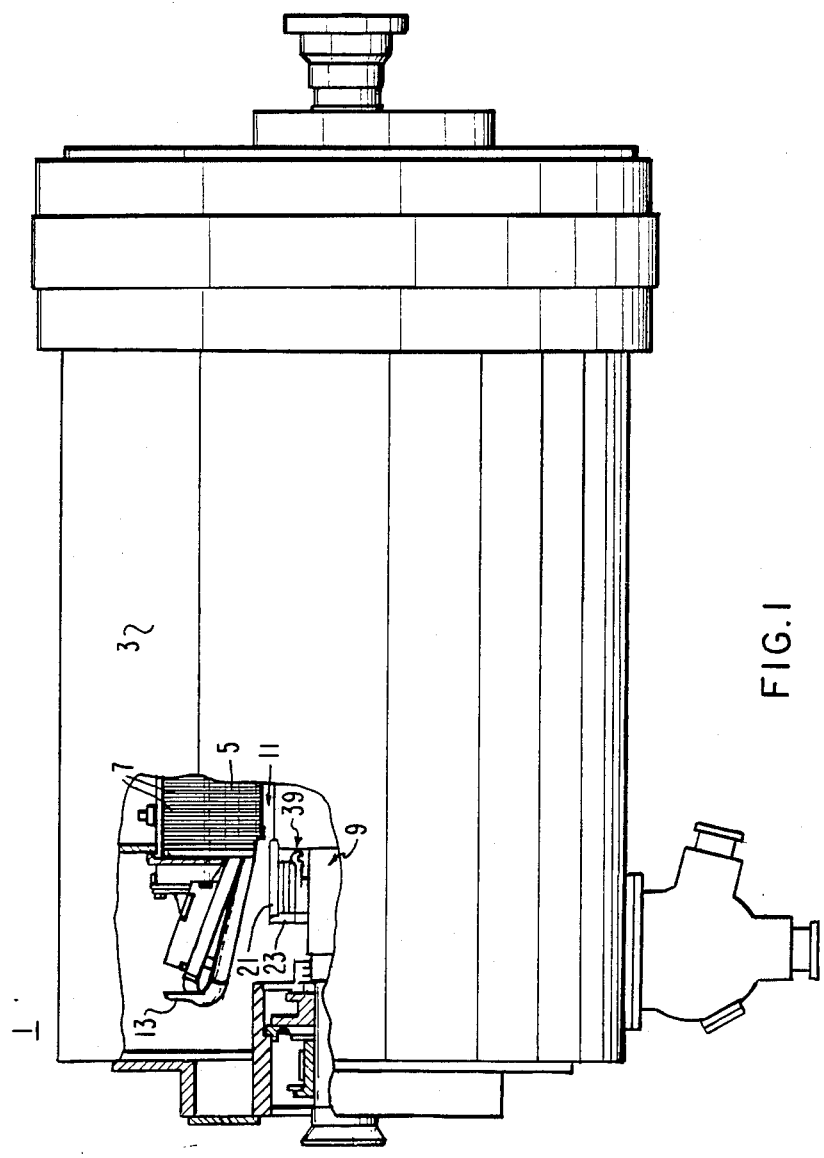
FIG. 1 is a transverse sectional view of an exemplary turbine generator in which the invention is incorporated.

Referring now to FIG. 1, there is illustrated the present invention incorporated in operating position within a dynamoelectric machine, a large turbine generator 1, shown as a generator of gas ventilated construction.

The generator 1 has a stationary outer gas-tight housing 3 that contains a laminated cylindrical stator core 5 formed from a plurality of axially adjacent magnetic laminations 7 which surround a rotor 9. The stator core 5 is spaced from the rotor 9 to leave a gap 11 therebetween. Stator winding coils are interconnected on both axial ends of the stator core 5 as stator end turns 13.

Figure 2:
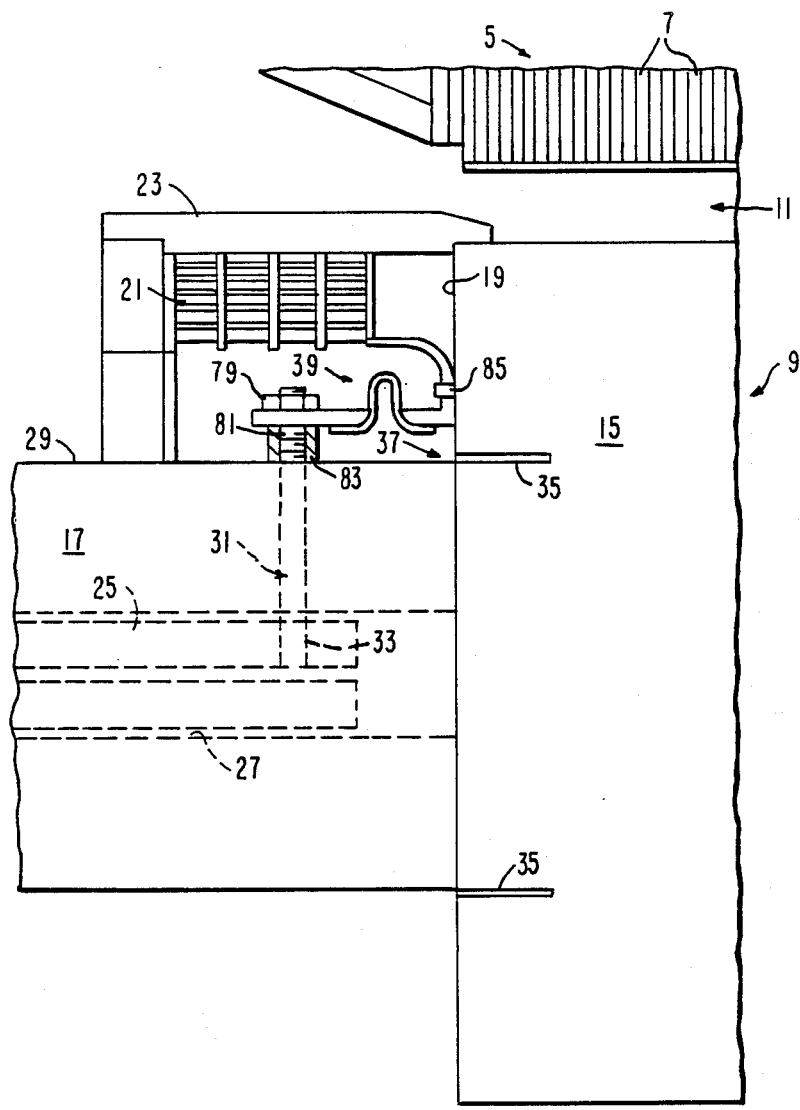
FIG. 2 is an enlarged view of the portion of the turbine generator of FIG. 1 incorporating the flexible conductor of the present invention.

As illustrated in FIG. 2, the rotor 9 has a central portion 15 disposed within the cylindrical stator core 5 and a shaft 17 extending axially therefrom with an end face 19 provided. A plurality of field windings 21 are mounted on the rotor 9 by supports 23, such as a retaining ring, such that the same are radially spaced from the shaft 17. These windings carry DC (direct current). The current comes from a collector or exciter (not shown) which is located in an end of the rotor 9. The current flows through axial leads 25 which are positioned in the bore 27 in the rotor 9, and the current is then transmitted to the shaft outer surface 29 by a radial lead 31 that is threaded, as at 33, into the axial lead 25. An undercut 35, such as a slot, may be formed in the end face 19 of the central portion 15 of rotor 9, leaving a gap 37 in the end face 19. A conductor is required to transmit current between the radial lead 31 and the field windings 21, which will bridge the gap 37 formed by the undercut 35. In, for example, a rotor having a central portion 15 of a diameter of about 63.5 cm (25 inches) the undercut would be on the order of 17.8 cm (7 inches) deep and 1.27 cm (0.5 inch) wide.

According to the present invention, the conductor which transmits current between the radial lead 31 and the field windings 21 comprises a flexible conductor 39 for electrically connecting the radial lead 31 to the plurality of field windings 21.

As best shown in FIGS. 3 to 6, the flexible conductor 39 has a first conductive member 41, such as a first strap 43, the strap 43 having an aperture 45 therein for securement to the radial lead 31 adjacent one end 47, and a second end 49. A second conductive member, such as a strap, 51 is comprised of a strap of a generally U-shaped configuration with a first leg 53, axially aligned with said first conductive member 41, having a first end 55 spaced from the second end 49 of the first conductive member 41 to form a gap 57 therebetween, a central section 59, and a second leg 61 having a second end 63 that is adapted to contact the field windings of a generator. A flexible connector 65 is provided that spans the gap 57 and conductively connects the second end 49 of the first conductive member 41 with the first end 55 of the second conductive member 51. A portion 67 of the flexible connector 65, as illustrated, extends through the gap 57 in the direction of the second end 63 of the second conductive member 51.

The flexible connector 65 is formed from a plurality of sandwiched thin strips 69 of conductive material that are sandwiched together. The thin strips 69 are slotted, as at 71, with a plurality of slots extending from a location adjacent a first conductive member attachment end 73 to a location adjacent a second conductive member attachment end 75. The flexible connector 65 is secured to the straps 41, 51 such as by brazing or bolting. The slots 71 are of a length such that the same extend at least through the length thereof forming the portion 67 extending through the gap 57 between the first conductive member 41 and second conductive member 51. Solid sections 77 remain between the slots 71 across the gap 57.

The flexible conductor 39 is preferably formed from copper, or other highly conductive material, and will vary in dimensions depending upon the size of the rotor and other system components. The thickness and width of the conductive straps 41, 51 may typically be on the order of 1.27 to 1.90 cm (0.5 to 0.75 inch) thick and about 2.54 to 5.08 cm (1 to 2 inches) in width. The flexible connector 65, is formed from a plurality of strips 69, such as five such strips sandwiched together, each having a thickness of about 0.8 cm (0.032 inch) and slotted, as illustrated in FIG. 5 to give a plurality, such as eight, of solid sections 77 having a width of about 0.71 cm (0.28 inch), the total length and width of the flexible conductive member 65 being less than the length and width of the straps 41, 51.

Since the present conductor is an electrical connection between the radial lead 31 and the field windings 21 across the undercut 35 in the end face 19 of the central portion 15 of the rotor 9, radial, tangential and axial flexibility must be minimal or the effectiveness of the undercut would be reduced or eliminated. In addition, to assure that a double running speed noise is not introduced, the radial and tangential stiffness of the flexible portion, flexible connector 65 spanning the gap 57, of the conductor 39 must be equal. To accomplish this requirement, the flexible connector 65 is in the form of a catenary connection so as to provide the required stiffness.

As shown in the drawings, the desired flexibilities are achieved by use of the catenary flexible connector 65 directed in the radial direction relative to the rotor. The radial and axial flexibility is controlled by the bending while the tangential flexibility is controlled by both bending and twisting. To reduce flexibility to a minimum, the flexible connector 65, as described, is made of a plurality of conductive strips 69 that are thin in the radial/axial direction relative to the first conductive member and second conductive member 41, 51. To obtain the tangential stiffness equal to the radial stiffness, the effective width of the conductive strips 69 is reduced by formation of the slots 71 before forming the portion 67 thereof extending through the gap 57. The width, thickness, size and number of strips 69 are chosen to obtain the stiffness in all directions sufficient to provide equal radial and tangential flexibility, as well as current carrying capacity of the flexible connector 65.

To reduce the stress due to centrifugal force, after the portion 67 of the flexible connector 65 is formed, the solid section 77 of the portion 67 of the thin strips 69 are formed into a curvature, upon connection to the rotor shaft, to match its radial position. This will result in the solid sections 77 of the strips 69 to be aligned radially as indicated at r in FIG. 6. Using the present structure, the radial and tangential stiffness is equalized and the stiffnesses are reduced to an acceptably low level to provide the desired flexible conductor between the radial lead 31 and the field windings 21 across the undercut 35.

The flexible conductor 39 is affixed to the rotor by any suitable means, such as by a threaded nut 79 coacting with a threaded end 81 of the radial lead 31, while a washer or other spacer 83 may be used to space the flexible conductor 39 from the surface 29 of the shaft 17. The radial lead 31 is passed through the aperture 45 in first conductive member 41, while the second conductive member 51 is secured to the end face 19 of the central portion 15 of the rotor by a clamp 85 securable thereto, the flexible conductor 39 thus spanning the gap 37 formed by the undercut 35.

I claim:

1. A flexible conductor for electrically connecting a radial lead of a generator rotor to radially spaced field windings of said rotor comprising:
   a first conductive member adapted for connection to the radial lead of said rotor;
   a second conductive member of a generally U-shaped configuration having a first end spaced from said first conductive member to provide a gap therebetween, and a second end adapted to contact said field windings; and
   a flexible connector spanning said gap, with a portion thereof extending through said gap in the direction of the second end of said second conductive member, said flexible connector formed from a plurality of thin strips of conductive material sandwiched together, each of said plurality of thin strips having slots therein, at least through the length thereof forming said portion extending through the gap between said first and second conductive members, sufficient to provide equal radial and tangential flexibility of said flexible connector.

2. The flexible conductor as defined in claim 1 wherein said first conductive member comprises a conductive strap having an aperture adjacent a first end thereof for connection to said radial lead, and said second conductive member comprises a conductive strap of a generally U-shaped configuration having a first leg aligned with said first conductive member and a second leg adapted to circuit said field windings.

3. The flexible conductor as defined in claim 2 wherein said flexible connector is in the form of a catenary connection between said first and second conductive members.

4. The flexible conductor as defined in claim 3 wherein the radial and tangential stiffness of said flexible connector are equal.

5. A dynamoelectric machine comprising:
   a cylindrical stator core formed of a plurality of axially adjacent laminations;
   a rotor, having an end face, disposed within said stator core and spaced therefrom, said rotor having a shaft extending from said end face, the shaft having axial leads therein, and a radial lead connected to said axial leads and extending from the surface of said shaft, the rotor having an undercut in the end face thereof;
   a plurality of field windings radially spaced from said rotor shaft; and
   a flexible conductor for electrically connecting said radial lead to said plurality of field windings, said flexible conductor constituting a first conductive member connected to said radial lead, a second conductive member of a generally U-shaped configuration having a first end spaced from said first conductive member to provide a gap therebetween, and a second end connected to said plurality of field windings, and a flexible connector spanning said gap, with a portion thereof extending through said gap in the direction of the second end of said second conductive member, conductively connecting said first conductive member and the first end of said second conductive member.

6. The dynamoelectric machine as defined in claim 5 wherein said first conductive member comprises a conductive strap having an aperture adjacent a first end thereof connected to said radial lead, and said second conductive member comprises a conductive strap of a generally U-shaped configuration having a first leg aligned with said first conductive member and a second leg contacting said field windings.

7. The dynamoelectric machine as defined in claim 6 wherein said flexible connector is formed from a plurality of thin strips of conductive material sandwiched together.

8. The dynamoelectric machine as defined in claim 7 wherein said plurality of thin strips have slots therein, at least through the length thereof forming said portion extending through the gap between said first and second conductive members.

9. The dynamoelectric machine as defined in claim 8 wherein said flexible connector is in the form of a catenary connection between said first and second conductive members.

10. The dynamoelectric machine as defined in claim 9 wherein the radial and tangential stiffness of said flexible connector are equal.

* * * * *